United States Patent Office 3,021,148
Patented Feb. 13, 1962

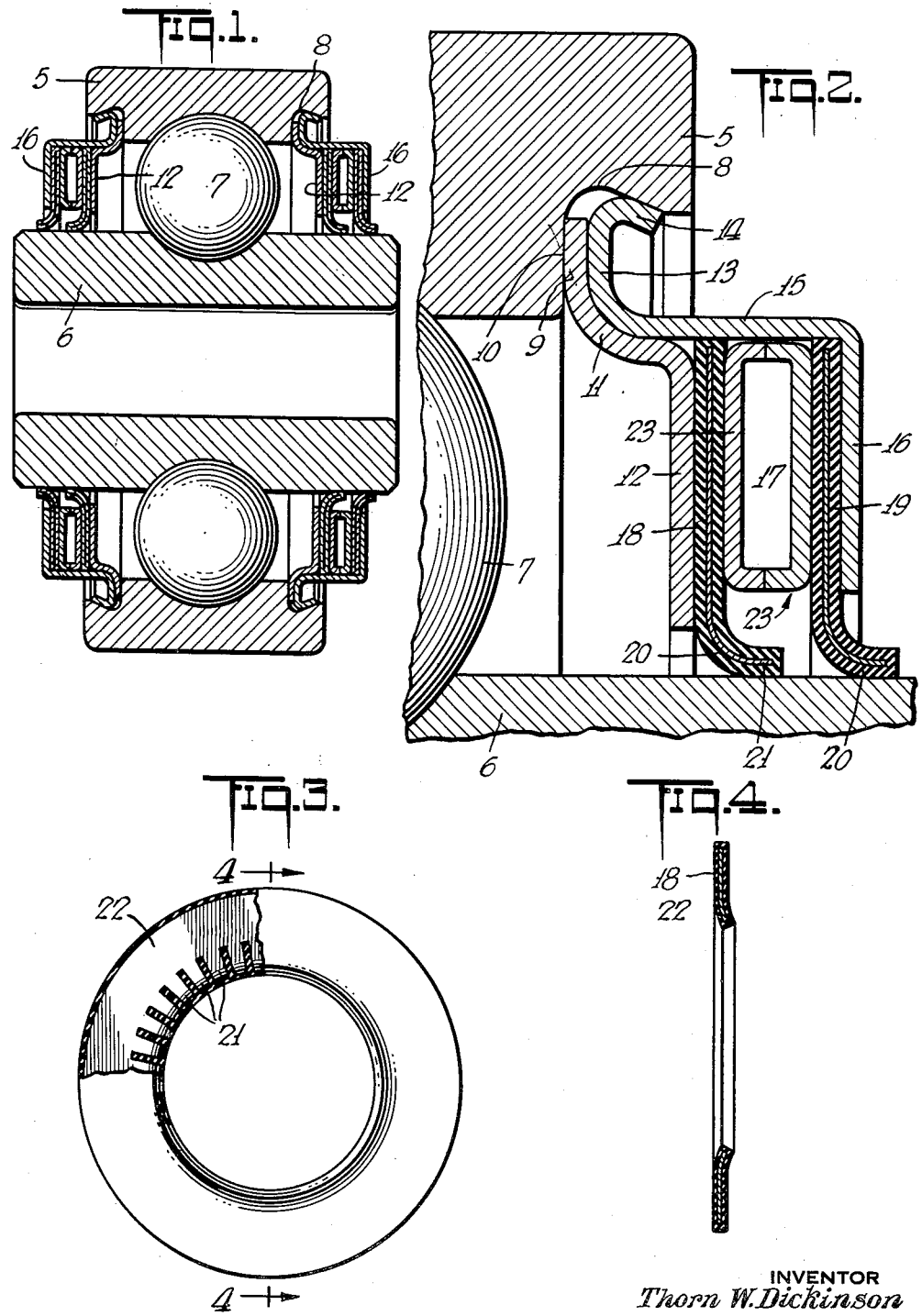

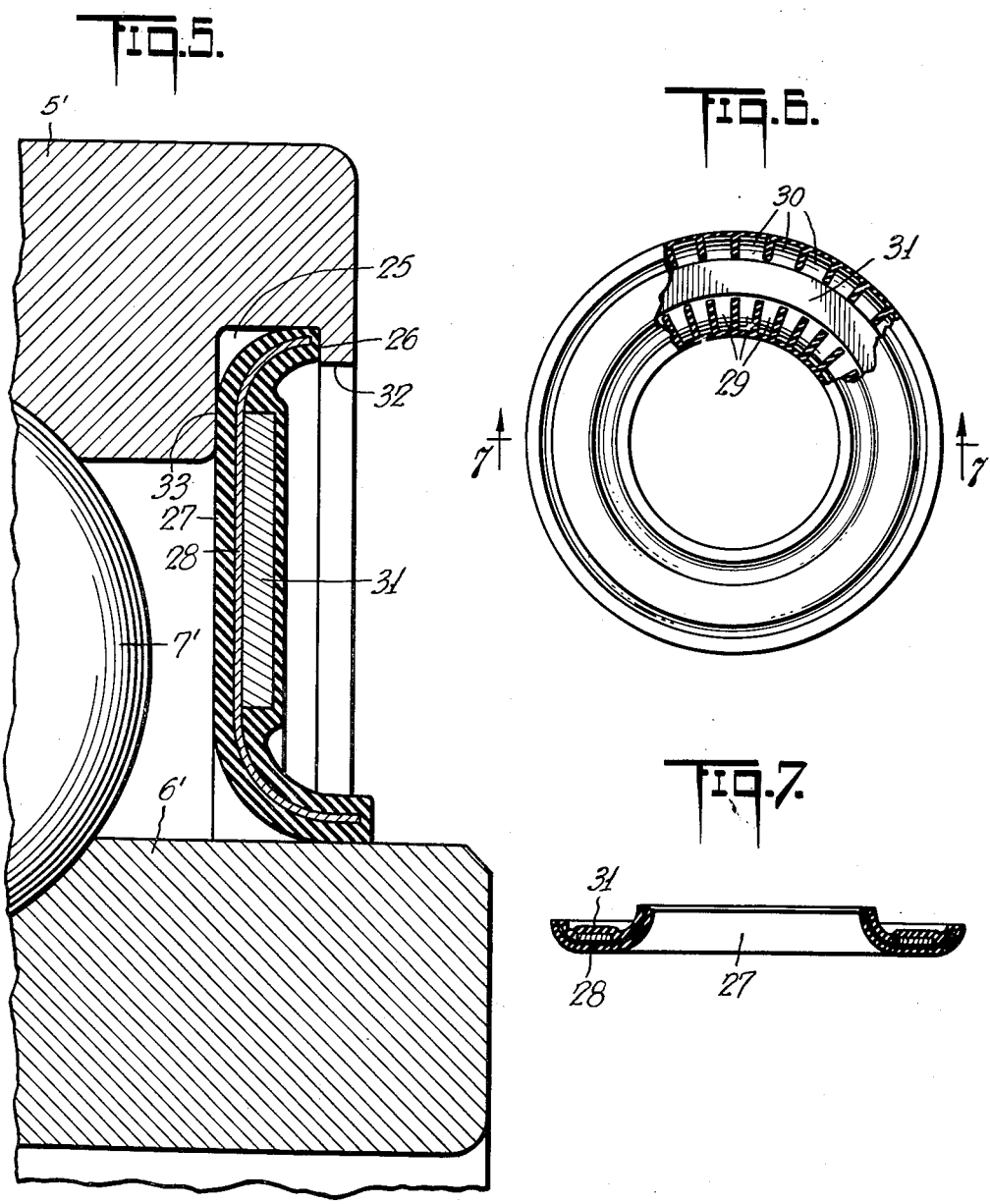

3,021,148
BEARING SEAL
Thorn W. Dickinson, New Britain, Conn., assignor to The Fafnir Bearing Company, New Britain, Conn., a corporation of Connecticut
Filed Apr. 30, 1957, Ser. No. 656,135
3 Claims. (Cl. 277—58)

My invention relates to a bearing seal and more particularly to a seal for an antifriction bearing.

It is an object of the invention broadly to provide an improved bearing seal for an antifriction bearing.

It is another object to provide an improved seal for a bearing, which will provide a very tight sealing engagement between a sealing member and a ring upon which it rubs.

Another object is to provide an improved seal for a bearing, which consists of few parts easily assembled with a bearing.

Another object is to provide a bearing, wherein a seal may be readily snapped into place and will hold with great security on one ring and rub with considerable force on the other ring.

It is another object to provide an improved bearing seal member with unitary plate and presser means for stiffening and resiliently urging the seal member into sealing contact with a bearing ring.

Other objects and various features of novelty and invention will be hereinafter pointed out or will become apparent to those skilled in the art.

Briefly stated, in a preferred form of the invention I provide bearing seal means, which preferably consists of a rubber or like seal member having spring presser fingers molded therein so as to urge the seal member into engagement with a bearing ring.

The presser fingers are part of a presser member which is molded in the rubber like seal member to stiffen the same and yet provide the resilient fingers to urge one periphery of the seal washer member into tight sealing engagement with a bearing ring.

The seal may consist of a single seal member which may be snapped into place on one ring and engage the other ring to seal the space between rings.

The seal may also consist of a plurality of seal members held on one ring in spaced apart relationship and rubbing on the other ring. Such plurality of seal rings may be held in an annular chamber carried by one ring and opening toward the other.

In the drawings, which show for illustrative purposes only, preferred forms of the invention—

FIG. 1 is a diametral sectional view through a ball bearing having seal means illustrative of the invention;

FIG. 2 is a much enlarged fragmentary sectional view of the bearing of FIG. 1;

FIG. 3 is an axial view in elevation, parts being shown in section, of a seal washer shown in FIGS. 1 and 2;

FIG. 4 is a sectional view, taken substantially in the plane of the line 4—4 of FIG. 3;

FIG. 5 is a view similar to FIG. 2, but illustrating a modified form of seal and its application;

FIG. 6 is a view in axial elevation, parts being broken away to show interior construction, of the seal member shown in FIG. 5; and FIG. 7 is a sectional view, taken substantially in the plane of the line 7—7 of FIG. 6.

In said drawings, the bearing to which the seal is applied may consist of a bearing having an outer ring 5, an inner ring 6, and interposed antifriction bearing members such as balls 7. The outer ring (FIGS. 1 and 2) has an undercut tapered groove 8 for receiving plate means forming part of the seal. In the form illustrated, there is a plate or washer 9 abutting an anvil 10 on the bearing and extending around at 11 and then radially at 12, so as to form a flat plate surface. There is another washer 13, which abuts the washer 9 and forces it against the anvil and has its outer edge 14 crimped or staked into the undercut groove 8 so as to hold the two washers in place. The washer 13 has an outwardly extending cylindrical portion 15 and a radially inwardly directed plate portion 16, both washers 12 and 16 extending toward the inner ring and being spaced therefrom and forming an annular chamber 17 facing the outer surface of the inner ring. These plates may be formed of sheet metal.

Within the chamber 17, between the plates 12 and 16, I place one or more seal washers 18—19 of an outer diameter about equal to the depth of the chamber 17 and which extend inwardly and are curved as indicated at 20 so as to provide flat sidewise or cylindrical bearing surfaces on the outer circumferences of the inner bearing ring 6. In the preferred form, these seal washers have resilient fingers 21, which are molded in or embedded in the rubber like or rubber material of which the washers 18—19 are formed. While these spring presser fingers 21 are embedded in the rubber, it is also desirable to embed the entire presser washer 22, which carries the spring fingers. These washers 22 are preferably molded right in the rubber washers and are preferably somewhat distorted at the inner periphery, as shown in FIG. 4, so that when the washers are passed over the inner ring, they will be further distorted and held against the inner ring with a secure sealing force, due not only to the resilience of the washer material itself, but to the spring fingers 21—21.

In the form shown in FIGS. 1 and 2, the seal washers 18—19 are duplicates of each other and both are held in the chamber 17 with their sides against their respective plates 12—16, as shown. The complete washers are spaced apart by suitable means, such as the thick annular spacer 23, which may be formed of two annular cup members secured together and pressing at opposite sides on the inner surfaces of the washers 18—19, as will be clear from FIG. 2. Thus, the washers will be securely held in the annular chamber 17 in such a way as to prevent oil or other material from flowing past the washers and the plates. As shown in FIGS. 1 and 2, the inner seal may be considered the primary seal, while the outer seal may act as a shield or supplementary seal to prevent foreign matter from reaching the inner seal. In any event, the seals grip the inner ring with the requisite sealing force and there is no danger of the fingers slipping or becoming misplaced or displaced on the washers since the pressers with the resilient fingers 21 are molded directly in the washers. The washers are of resilient material, preferably of rubber, and the pressers 22 are of resilient spring material, preferably spring sheet metal.

In the modification shown in FIGS. 5, 6 and 7, the outer ring 5', the inner ring 6', with interposed balls 7', constitute the bearing, and one of the rings (in this case the outer ring) is provided with an annular groove 25 for receiving a seal, and this groove preferably has an abrupt, inwardly facing shoulder 26 at the outer edge. The seal washer itself has spring fingers molded therein at both the inner and outer peripheries, so that at one periphery the seal is held by a spring forced in place in one ring and bears with proper sealing force at the other periphery. As illustrated, the washer 27, formed of rubber or rubber like material, has what may be termed a presser member 28 embedded therein and having spring fingers 29 at the inner periphery and spring fingers 30 at the outer periphery. In order to stiffen the washer, there may be a reinforcing disc or washer 31 molded in the rubber washer, and this disc may be secured to the presser member 28. When it is desired to apply the seal to a bearing, the seal washer is stretched over the inner ring and the seal caused to take the shape at the inner periphery, as illustrated in FIG. 5. Thus, there is a good side or cylindrical surface of the washer in contact with the outer cylindrical surface of the inner ring. When the washer is pushed in, the outer periphery slides past the lip 32 defining the outer edge of the groove 25, and the outer spring fingers 30 then spring outwardly so as to cause the outer periphery of the washer to wedge tightly in the groove 25 with the back of the washer in contact with the anvil portion 33 and the peripheral portion of the washer in secure contact with the bottom of the groove and preferably also with the shoulder 26. The seal shown in FIG. 5 is very easy to apply to the bearing by simply forcing the same inwardly to cause the inner periphery of the washer to ride over the end of the inner ring and to cause the outer periphery of the washer to slip into the groove 25 and be securely wedged and held therein. The outer periphery of the washer is sealed tightly against the outer ring, and the inner periphery is in sealing engagement with the outer surface of the inner ring.

It will be seen that I have provided a very simple seal, which may be readily applied, and which will be highly effective in holding lubricant in the bearing and excluding foreign matter therefrom.

While the invention has been described in considerable detail and preferred forms illustrated, it is to be understood that various changes and modifications may be made within the scope of the invention as defined in the appended claims.

I claim:

1. A seal for an antifriction bearing comprising a unitary seal washer of resilient material having a presser member with spring fingers at the inner periphery embedded in said resilient material substantially throughout the radial dimension of said material, said seal washer being adapted to be secured to the outer bearing ring of a bearing and having its said inner periphery adapted to fit in sealing engagement with the outer cylindrical surface of an inner bearing ring and said inner periphery of resilient material being urged into such sealing engagement by said spring fingers so that said washer is spring loaded to form a tight and effective seal, a second seal washer of resilient material having spring fingers embedded in the inner periphery, said second seal washer being adapted to be secured to said outer ring and having its inner periphery adapted to fit in sealing engagement with the cylindrical surface on the inner of said rings and urged into such sealing engagement by its said spring fingers, a radially inwardly directed plate portion formed integrally at its outer periphery with a cylindrical portion, and a thick annular spacer intermediate the seal washers so that the washers are held in place to form a tight and effective seal.

2. In a bearing seal for a bearing having inner and outer bearing rings with interposed antifriction bearing members, a pair of plates carried by said outer ring and having spaced apart parts forming an annular chamber facing the outer cylindrical surface on said inner ring, a seal washer of resilient material in said chamber and extending to and distorted to fit the said cylindrical surface, a presser member having spring fingers embedded in said seal washer and urging said seal washer into sealing seating engagement with said cylindrical surface.

3. In the combination defined in claim 2 and a duplicate sealing washer and presser with spring fingers in said chamber and spaced from said first sealing washer.

References Cited in the file of this patent
UNITED STATES PATENTS

| | | |
|---|---|---|
| 2,276,225 | Carter | Mar. 10, 1942 |
| 2,560,557 | Curtis | July 17, 1951 |
| 2,587,405 | Stevens et al. | Feb. 26, 1952 |
| 2,755,113 | Baumheckel | July 17, 1956 |
| 2,764,433 | Cobb | Sept. 25, 1956 |
| 2,887,331 | Johnson | May 19, 1959 |

FOREIGN PATENTS

| | | |
|---|---|---|
| 978,288 | France | Nov. 22, 1950 |
| 465,991 | Italy | Oct. 8, 1951 |
| 514,842 | Canada | July 19, 1955 |